(12) United States Patent
Friedland

(10) Patent No.: US 8,683,959 B2
(45) Date of Patent: Apr. 1, 2014

(54) LOCKING PET LEAD SYSTEM COMPRISING A LEASH AND COLLAR TO PREVENT THE THEFT OF PETS

(75) Inventor: Michael Friedland, Brooklyn, NY (US)

(73) Assignee: Pawz Dog Boots, LLC, Brooklyn, NY (US)

( * ) Notice: Subject to any disclaimer, the term of this patent is extended or adjusted under 35 U.S.C. 154(b) by 26 days.

(21) Appl. No.: 13/303,989

(22) Filed: Nov. 23, 2011

(65) Prior Publication Data

US 2012/0103278 A1    May 3, 2012

Related U.S. Application Data

(63) Continuation of application No. 13/107,327, filed on May 13, 2011.

(60) Provisional application No. 61/334,414, filed on May 13, 2010.

(51) Int. Cl.
  *A01K 27/00* (2006.01)
(52) U.S. Cl.
  USPC .............................. 119/792; 119/793; 119/797
(58) Field of Classification Search
  USPC ................. 119/792, 769, 794–798, 776, 772, 119/857–859, 863–865, 770, 793; D30/153, 151
  See application file for complete search history.

(56) References Cited

U.S. PATENT DOCUMENTS

| | | | |
|---|---|---|---|
| 2,765,648 A * | 10/1956 | Hatcher ........................... | 70/264 |
| 3,017,678 A * | 1/1962 | Christensen ................ | 24/134 R |
| 3,841,118 A * | 10/1974 | Stone ................................. | 70/33 |
| 4,086,795 A * | 5/1978 | Foster et al. ..................... | 70/233 |
| 4,398,500 A * | 8/1983 | Koronkiewicz ............... | 119/793 |
| 4,609,780 A * | 9/1986 | Clark ........................ | 379/102.06 |
| 4,878,270 A * | 11/1989 | Westerkamp ............... | 24/132 R |
| 5,722,351 A * | 3/1998 | Roper ........................... | 119/795 |
| 6,095,094 A | 8/2000 | Phillips | |
| 6,205,956 B1 * | 3/2001 | Dickie et al. .................. | 119/792 |
| 6,269,777 B1 | 8/2001 | Prusia | |
| 6,470,718 B1 * | 10/2002 | Yang ................................ | 70/30 |
| 6,581,548 B1 * | 6/2003 | Reid ............................. | 119/795 |
| 7,104,093 B2 * | 9/2006 | Ling et al. ......................... | 70/30 |
| 7,174,859 B2 * | 2/2007 | Lee ................................. | 119/863 |
| 7,293,438 B2 * | 11/2007 | Benda .............................. | 70/18 |
| 7,980,201 B2 * | 7/2011 | Muelken ....................... | 119/792 |
| 8,156,901 B2 * | 4/2012 | Muelken ....................... | 119/720 |
| 8,225,629 B2 * | 7/2012 | Zuraski et al. .................... | 70/21 |
| 8,297,795 B2 * | 10/2012 | Huang .......................... | 362/277 |
| 2006/0243005 A1 * | 11/2006 | Lai et al. ........................... | 70/21 |
| 2009/0255484 A1 | 10/2009 | Muelken | |
| 2010/0111600 A1 * | 5/2010 | De Bien ........................ | 403/375 |
| 2011/0174024 A1 * | 7/2011 | Yu ................................... | 70/58 |

* cited by examiner

*Primary Examiner* — Andrea Valenti
(74) *Attorney, Agent, or Firm* — Davidson, Davidson & Kappel, LLC

(57) ABSTRACT

A lead system for domesticated animals has a lock capable of securing the collar and the handle ends to prevent theft of the animal. The lead system has a leash having a handle at one end and a collar at the opposing end. The lead system may have a first lock at the collar end and a second lock at the handle end which are separately activated for fastening the handle to the leash at one end of the leash and the collar to the leash at the other end for securing an animal to an immovable object. Alternatively, the lead system may have a lock capable of simultaneously securing the collar and handle ends. The lead system may also allow for adjustment of the circumference of the collar and the handle through the use of levers, with the lock(s) capable of also securing the levers.

18 Claims, 22 Drawing Sheets

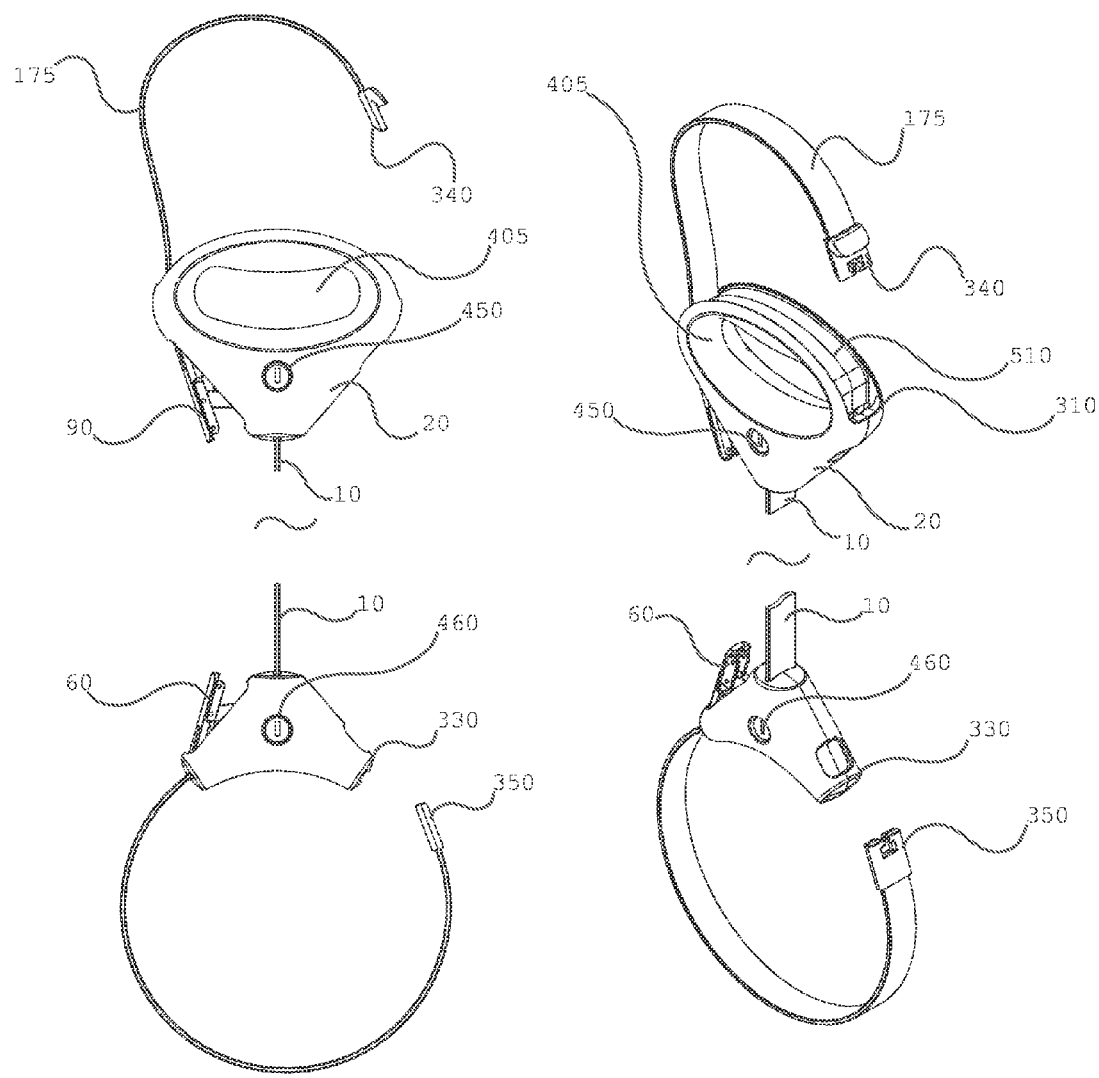

LOCKING PET LEAD SYSTEM COMPRISING A LEASH AND COLLAR TO PREVENT THE THEFT OF PETS

This application is a continuation of U.S. patent application Ser. No. 13/107,327, filed May 13, 2011 entitled Locking Pet Lead System Comprising a Leash and Collar to Prevent the Theft of Pets, the disclosure of which is hereby incorporated by reference in its entirety.

BACKGROUND OF THE INVENTION

The greatest concern for people leaving their domesticated animals, such as a dog or cat, outside is unquestionably theft. On occasion, people also need to leave their animals alone in a car for a period of time. On a hot day this is dangerous as the inside of a car can rise to deadly temperatures, but leaving the windows open risks theft of the animal.

A standard lead provides no way to secure an animal from theft. Attempts to address this problem include leads which incorporate a lock to secure the collar to the pet, a lock to secure the collar to the leash and an additional lock to secure the handle to an immovable object. Other attempts to secure an animal from theft have required the lead to be removed so that the leash can be looped around an object before being reattached and locked. For example, some leads require the user to 'unhook' from the dog to put the length of leash around a fence before feeding it back through the locking mechanism.

This is both dangerous and impractical. These solutions are problematic. A locking lead that needs to be removed from the pet endangers the pet and bystanders.

U.S. Pat. No. 6,095,094 to Phillips, Aug. 1, 2000 depicts a leash requiring two locking points and a separate collar.

U.S. Pat. No. 6,269,777 to Prusia, Aug. 7, 2001 describes a leash that is designed to be locked so that the dog cannot remove it. It is not designed to lock to an object or secure the pet from theft.

U.S. Patent Application No. 2009/0255484 A1, Muelken, Oct. 15, 2009, incorporates three different locking points and three different locks to handle the collar, the leash and the secure object. This is not a practical solution for the average person doing errands.

SUMMARY

The current invention solves these problems by producing a pet lead system having a first lock located at the collar end of the leash and a second lock located at the handle end of the leash which are activated either separately or simultaneously to secure a fastener at the collar end and a fastener at the housing end so that the leash cannot be opened. The lead system may also include a first lever for adjusting the circumference of the collar and a second lever for adjusting the circumference of the handle, wherein said first lock secures the collar lever and the second lock secures the handle lever such that the circumferences of the collar and the handle cannot be adjusted. In this manner, the lead system can lock around stationary objects of varying sizes and can lock around animals of varying sizes. The consumer advantages of the current invention include security, safety of the animal and public, ease of use and peace of mind. In certain embodiments, the lead system does not need to be removed from the animal at any point in the locking process. In other embodiments, the lock at both the collar and handle ends of the leash can be operated from a single point leading to ease of use. Another object of the invention is to provide a lead system that allows the windows of a vehicle to be rolled down while the animal is secured to e.g. steering wheel thereby allowing ventilation of the inside of the vehicle while preventing theft.

It is an object of the present invention to provide a lead system for domesticated animals having a lock capable of securing the collar and the handle ends to prevent theft of the animal. The lead system comprises a leash having a handle at one end and a collar at the opposing end from the handle. The lead system may have a first lock at the collar and a second lock at the handle which are separately activated for fastening the handle to the leash at one end of the leash and the collar to the leash at the other end so that the animal can be secured to an immovable object. Alternatively, the lead system may have a lock capable of simultaneously securing the collar and handle ends. The lead system may include a first lever for adjusting the circumference of the collar and a second lever for adjusting the circumference of the handle, with the first lock also securing the collar lever and the second lock also securing the handle lever. In certain embodiments, an animal can be protected from theft without the user having to remove the lead from the dog to engage the lock at the collar or handle ends. In embodiments, the circumference of the handle can be adjusted to fit a stationary object and the circumference of the collar can be adjusted to comfortably fit animals of varying sizes and the circumference can then be secured to protect the animal from theft.

In certain embodiments of the present invention, the lead incorporates a cable or cables that give the lead strength and make cutting the lead difficult. These cables may also activate the locking mechanism, allowing both the collar and the handle to lock simultaneously from one lock.

DESCRIPTION OF THE DRAWINGS

FIG. 23 is a view of the collar end and housing end of a lead system, showing the fasteners not engaged and the levers open, allowing for expansion or contraction of the circumference of the handle and collar loop, including a handle housing having an opening defining a handle.

FIG. 24 is a view of the lead system, showing the levers open and also showing the handle housing in the shape of a grip with the top of the handle housing containing a recessed area into which the leash can be contained.

DETAILED DESCRIPTION OF PRESENT EMBODIMENT

Figure 1:
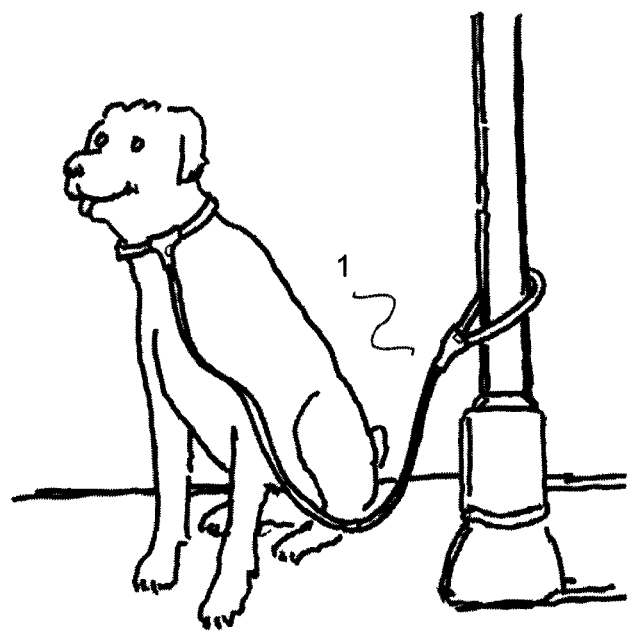
FIG. 1 view of a dog secured to a light post using the locking lead system of the present invention.

The present invention provides a lead system having a lock at the handle and a second lock at the collar, without the need to remove the leash from the pet during the locking process. In certain embodiments, the lock at both the collar and the handle of the lead system can be operated from a single point. In other embodiments, these locks are operated separately.

The lead system is comprised of a lead which is looped at each of its ends to form a collar and a handle. The collar of the leash is placed around the neck of a domesticated animal and the collar end of the leash is attached to a fastener. In certain embodiments, the collar end of the leash terminates in a connector which attaches to the fastener. The fastener may be located on or within the leash itself or in a collar housing located at the collar end of the leash.

The collar may be sized to be tight enough to make it difficult or impossible to remove the collar from the animal's head, while still being comfortable for the animal. In certain embodiments, the size of the collar is adjustable.

The connector at the collar end of the leash may be attached to the fastener without engaging the lock for easy removal when security is not a concern. When the lock is engaged, however, the attachment cannot be released until the lock is disengaged.

Similarly, the handle end of the leash is formed by attaching the handle end of the leash to a fastener which may be located on or in the leash itself or in a handle housing located at the handle end of the leash. In certain embodiments, the handle end of the leash terminates in a connector which attaches to the fastener. In certain embodiments, the size of the handle is adjustable. The connector at the handle end of the leash may be attached to the fastener without engaging the lock for easy removal when security is not a concern. When the lock is engaged, however, the attachment cannot be released until the lock is disengaged.

To secure a domesticated animal to an immovable object such as a pole or steering wheel of a car, one end of the handle's loop is disconnected to open the handle loop, which is placed around an immovable object and then reattached to the leash at the faster. In certain embodiments, the size of the handle can be adjusted to accommodate larger or smaller immovable objects such as a steering wheel in a car or a telephone pole. The leash is then secured when needed by engaging the lock at the collar end and the lock at the handle end. In certain embodiments, the lock at the collar end and the lock at the handle end are simultaneously engaged by a locking mechanism, such as by use of a solenoid, as described below.

The connectors can be attached to the fasteners in ways commonly understood by one of skill in the art. Suitable connections include T shaped head that fits into a connecting slot (as depicted in certain of the Figures), a clip, latch, clutch or grommet.

In certain embodiments, the collar is formed by extending an end of the leash having a connector through openings in the top and bottom of a collar housing and looping the end of the leash back to attach to a fastener located on the collar housing. In certain embodiments, the fastener is located on the top of the collar housing, on the opposite side from the opening through which the leash extends to form the loop of the collar. The handle can similarly be formed by extending the opposing handle end of the leash, which may also terminate in a connector, through openings in the handle housing and looping the end around and back to a fastener located on the handle housing. In certain embodiments, the fastener is located on the top of the handle housing, on the opposite side from the opening through which the leash extends to form the loop of the handle. In embodiments incorporating a collar housing and a handle housing, the housings can be made of a material resistant to breaking, such as a break resistant plastic or a metal.

The interior of the leash may be comprised of a strong material to create a security cable. Appropriate materials would include a metal, such as steel, or other cut resistant materials.

The leash may also be made of a soft and pliable synthetic rubber or plastic, e.g. silicone, that is also tough and resistant to damage. In other embodiments, the leash is made of nylon, textiles, natural and manmade, leather, cotton, etc.

In other embodiments the leash may be leather with a steel cable, woven textile, natural or manmade, with a steel cable reinforced core. The leash may be comprised of any flexible, durable and break resistant material with a core of steel cable running through it. An embodiment with a leash made of chainmail, or other material resistant to cutting or breaking, would not require an interior having a steel cable.

In certain embodiments, the outer portion of the leash is preferably comprised of a pliable and durable material which may be either man made or of a natural material. In certain embodiments, the material forming the outer portion of the leash can withstand the forces exerted on an animal lead system, e.g. the pulling of an animal. In further embodiments, the outer portion of the leash is made of a material resistant to being cut to prevent or deter theft. Suitable materials may include rubber, plastic, silicone rubber, leather, nylon or cotton. In an embodiment of the present invention, the outer portion is made of a synthetic plastic, rubber or silicone rubber which offers the manufacturing advantage of being made using a molding process.

The length and width of the leash may vary depending on the size of the domesticated animal for which the lead system is used. The leash of the present invention is of a suitable shape such as flat or round and may, as discussed above, be made of a flexible and/or durable and/or break resistant and/or cut resistant material such as leather, plastic or chain mail. In certain embodiments, the leash is made of a belt shaped elastomer with at least one cut resistant cable, such as steel, running through its interior. In certain embodiments, the width of the leash is from about 0.5 inches wide to about 1 inch wide and is from about 3 feet long to about 5 feet long and is approximately 0.25 to 0.375 inches thick. In other embodiments the leash can range from about one-eighth to about one-half inches thick. In other embodiments, the leash is one quarter inches thick. In certain embodiments, the leash may be retractable to increase or decrease the length of the leash. The dimensions may vary to accommodate different sizes and weights for different breeds and types of domesticated animals.

In one embodiment of the present invention, the leash is comprised of a single length of belt shaped elastomer with at least one steel cable extending through the core to deter or prohibit cutting. In additional embodiments, there may also be at least one electrical wire(s) to transmit power to a solenoid from either a lock located within the handle housing or an activation point, such as a button located on the handle housing. In other embodiments, it is possible that a steel cable or other metallic cable could be used to transmit power in place of the wire(s).

In certain embodiments, the locks for the collar and the handle are contained within housing. The locks may be any suitable lock known to one of skill in the art, for example, a mechanical lock such as a key lock, a combination lock or a finger print identification lock, a magnetic or card reader lock or an electronic lock such as solenoid motor with a battery power source or combinations of the above.

In certain embodiments of the present invention, there is a single type of lock that engages or releases the attachment between the collar/handle ends of the leash and the respective fasteners. The lock may engage or release the attachment between the collar/handle ends and the respective fasteners simultaneously in such embodiments. In other embodiments, more than one lock may be used in the invention. For example, in certain embodiments, a combination lock and a key lock may both be used. The combination lock may be preferable for the owner's use but where the owner does not want to let others know the combination, a key can be used, e.g. by a dog walker for the same purpose. In other embodiments, an electronic lock may be combined with a manual lock which can be used to override the electronic lock. In this system, if the electronic lock fails, the lead system can still be locked and unlocked using the manual system.

In one embodiment, situated in the collar housing is a device that converts energy into linear motion such as a solenoid or linear actuator. When the handle lock is activated (e.g. by activating a combination or key lock or by pushing an activation button after the combination or key lock is set), an electric current transmitted from a battery source located in the handle flows around the electromagnet which then magnetically draws e.g. a metal pin or cylinder into or out of the solenoid housing. In certain embodiments, when the lock is engaged, the metal pin or cylinder is pushed into a position that blocks a release button located on the side of the housing so that the release button cannot release the connector attached to the collar fastener.

In other embodiments, the collar is locked mechanically with a steel cable, or a cable made of similarly cut resistant material, that connects with the locking mechanism in the handle's housing.

The lead system allows for the release of the connector from the fastener at the handle end of the leash so that the handle can be secured to an immovable object. In certain preferred embodiments, both the lock for the handle and the lock for the collar are engaged and disengaged from a single release activation point (e.g. a button or lock), which may be located anywhere along the lead, collar or handle. Preferably, the activation point is located on the handle end of the leash or on the handle housing for convenience of the user. For example, the activation point can be a button located adjacent to a combination or key lock on the handle housing or can be the lock itself. When the activation point is activated, for example by pressing on a designated spot (e.g. a button) on the handle or handle housing, neither the handle nor the collar can be opened.

In certain embodiments, when the lock is engaged, the button for releasing the connector from the fastener is blocked, such that it cannot be activated and the handle end/collar end cannot be released from the respective housings. For example, the engagement of the lock can cause a pin to block a handle release button and prevent activation of the release button. When the lock is not engaged, the handle can be opened by pressing a release button on the handle to disconnect the connector from the fastener.

In certain embodiments, the collar can be adjusted to fit animals having varying neck sizes. This is accomplished by adjusting the length of the leash extending through the collar housing to reduce or expand the circumference of the collar loop.

In certain embodiments of the present invention, whether the lock works simultaneously at the handle and the collar or comprises two separate mechanisms that secure the handle end of the leash and collar end of the leash separately, the handle housing may include a lever or latch, which when in the open position, allows the leash to slide through the handle housing to increase or decrease the circumference of the loop of the handle so that the handle can be adjusted in size to fit and lock around a desired object. When the lever or latch is in the closed position, a clamp holds the leash in place so that the handle size is no longer adjustable. Other embodiments may secure the leash in the housing with a screw, pin or other method that keeps the lead from moving. Similarly, the collar housing may also include a lever or latch, which when in the open position, allows the leash to slide through the collar housing to increase or decrease the circumference of the collar so that the collar can be adjusted in size to fit and lock around a desired domesticated animal. When the lever or latch is in the closed position, the lever or latch activates a clamp which holds the leash in place so that the collar size is no longer adjustable. In certain embodiments, when the lock is disengaged, a button on the lever or latch can be pressed to release the clamp. When the button on the lever or latch for the handle is compressed, the handle loop is free to be adjusted. When the button on the lever or latch for the collar is compressed, the collar loop is free to be adjusted. In embodiments having a lever or latch, the lever or latch can be locked or unlocked using the locks at the housing and the collar so that the size of the handle and collar cannot be adjusted when the lead system is locked.

In certain embodiments of the present invention, the handle housing may have an opening defining a handle such that the user can grip the handle housing. The handle housing may also include a recess for containing the leash at the handle end. The handle end of the leash may be removed from the handle housing when the button on the lever or latch for the handle is compressed, allowing the handle end of the leash to be adjusted in size.

In certain embodiments, the lock moves to block the release button from moving. For example, a flat metal piece can rotate in the center of the lock when the lock cylinder is turned. This metal piece in turn may rotate two blocking elements that prevent the buttons from being compressed. In this embodiment, when the lock is turned to the unlocked position, the blocking elements rotate out of the way and the buttons are free to move. The rotating metal piece that moves the blockers can be held in position (either locked or unlocked) e.g. by a spring. When the lock cylinder is turned, the mechanism moves into either the locked or unlocked position, with the spring keeping the blocking elements in position (either locked or unlocked) until the lock cylinder is turned again. In certain embodiments, the collar and handle housings may have the same locking mechanism.

The housing may also include one or more batteries for powering a motor in the collar. The motor enables simultaneous locking of the handle end to an immovable object and the collar end around the neck of an animal. In an embodiment of the present invention, the lock contains an electronic motor, with one or more electrical wires running through the interior of the leash to supply power from one or more batteries to a motor. An example of a suitable motor is a solenoid motor, as depicted in certain of the Figures and discussed below. When the lock is a solenoid mechanism located, for example, in the collar housing, the lock may be activated by an activation point on the handle housing. When the lock is set, it allows the lock button to be pressed which in turn sends an electric current to the solenoid which ejects a pin that blocks the collar release button. When the lock in the collar is a mechanical lock, like a cable connector, the collar lock is activated by turning a key lock or pressing a button that moves the cable into or out of position.

In an embodiment of the present invention, the handle end of a leash extends through a handle housing which contains one or more locks such as a combination lock, key lock or a fingerprint lock. In some embodiments, the lock at the handle and collar ends can secure the fasteners simultaneously. In these embodiments, handle housing may also contain one or more batteries used to power an appropriate motor such as a solenoid locking mechanism. The leash runs through the housing from an opening in the bottom end of the housing and then proceeds out of an opening in the top end of the housing and loops back to attach to the housing at a fastener located at the opposing side of the top of the housing to create a loop handle. The fastener can open and close so that the handle can be fastened around an immovable object. When desired, the fastener can be locked so that it cannot be opened without a key or combination or other appropriate means for disengaging the lock. At the opposing end of the leash from the handle, the leash extends through a collar housing which contains one or more locks such as a combination lock, key lock or a fingerprint lock or a electronic lock such as a solenoid. The collar housing may also contain one or more batteries used to power an appropriate motor such as a solenoid locking mechanism. The leash runs through the housing from an opening in the bottom end of the housing and then proceeds out of an opening in the top end of the housing and loops back to attach to the housing at a fastener located at the opposing side of the top of the housing to create a loop collar. The fastener can open and close so that the collar can be fastened around a domesticated animal. When desired, the fastener can be locked so that it cannot be opened without a key or combination or other appropriate means for disengaging the lock.

FIG. 1 shows use of a lead system 1 of the present invention. A domesticated animal, here a dog, is securely locked to a pole using the present lead system wherein a locking system securely locks the animal's collar and the handle of the lead system. The locking system may simultaneously secure the animal's collar and the handle of the lead system or the locking system may be separately locked at the collar and the handle. The size of the collar and the handle are adjustable.

Figure 5:
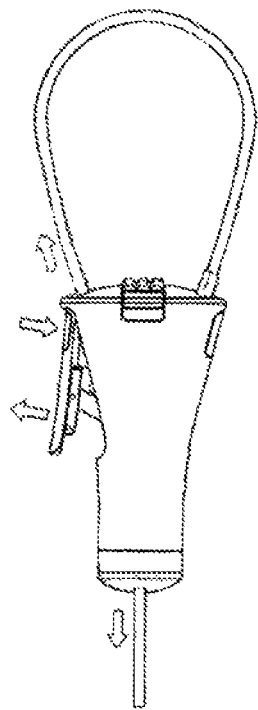
FIG. 5 is a back view of a leash handle showing a latch for adjusts the length of the leash in an open position.
Figure 6:
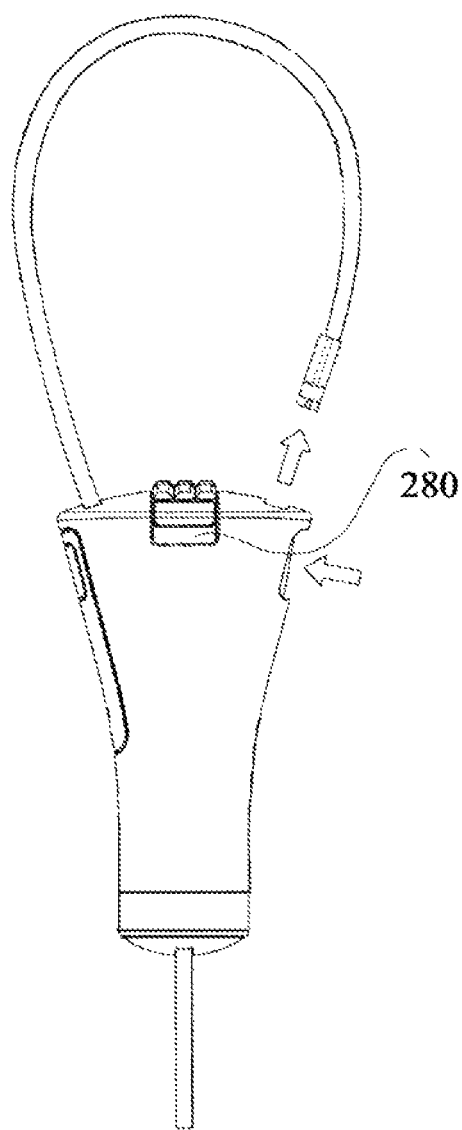
FIG. 6 depicts a leash handle with the handle opened for securing the handle to an object such as a light post.
Figure 7:
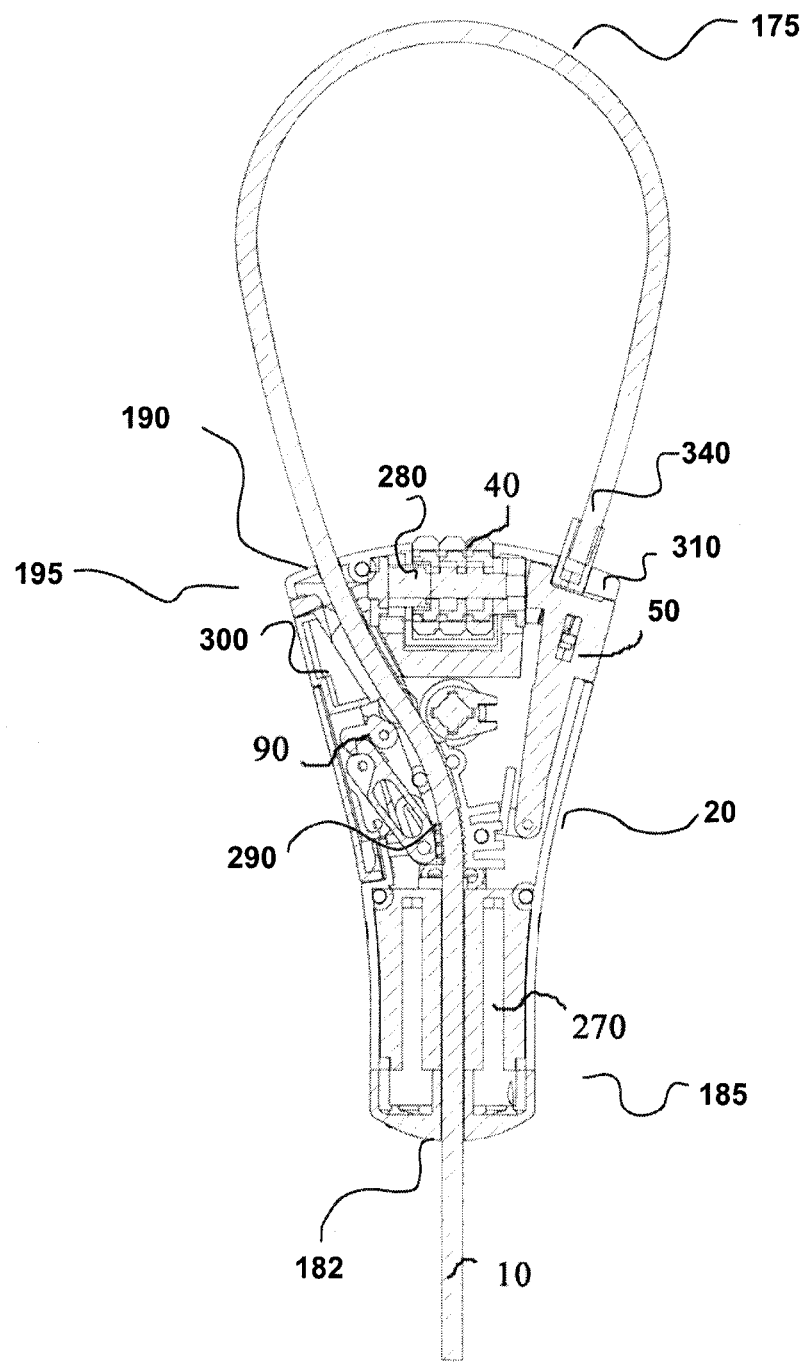
FIG. 7 is an interior view of a handle.
Figure 10:
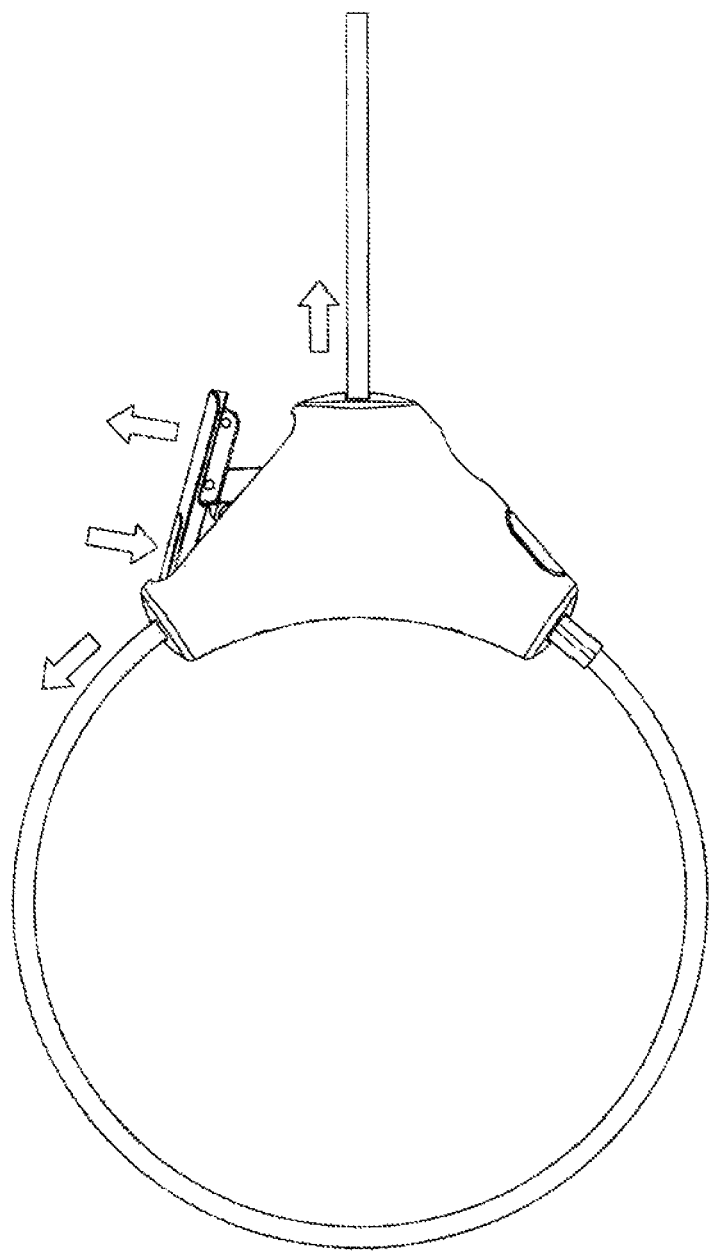
FIG. 10 is a view of a collar showing a latch for adjusting the size of the collar in an open position.
Figure 11:
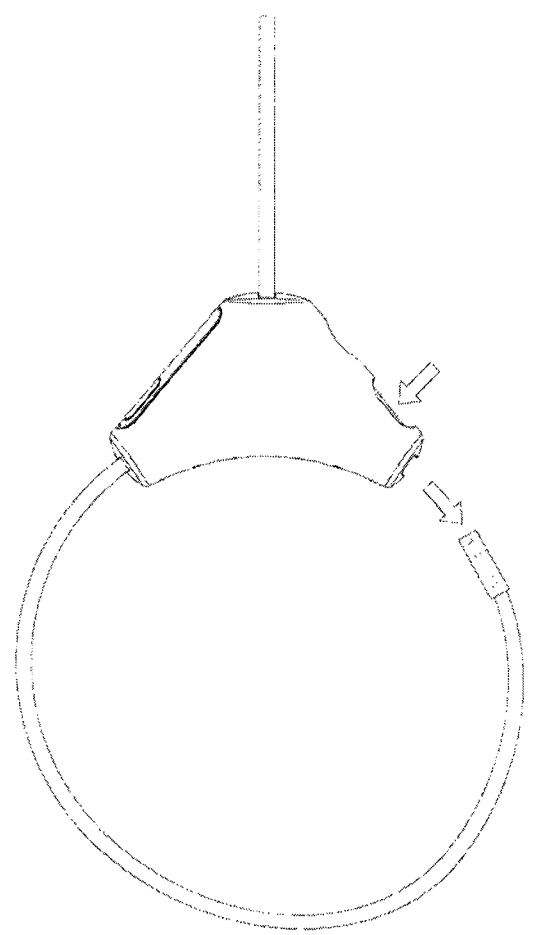
FIG. 11 is a view of a collar in the open position, for securing the collar to a pet.
Figure 12:
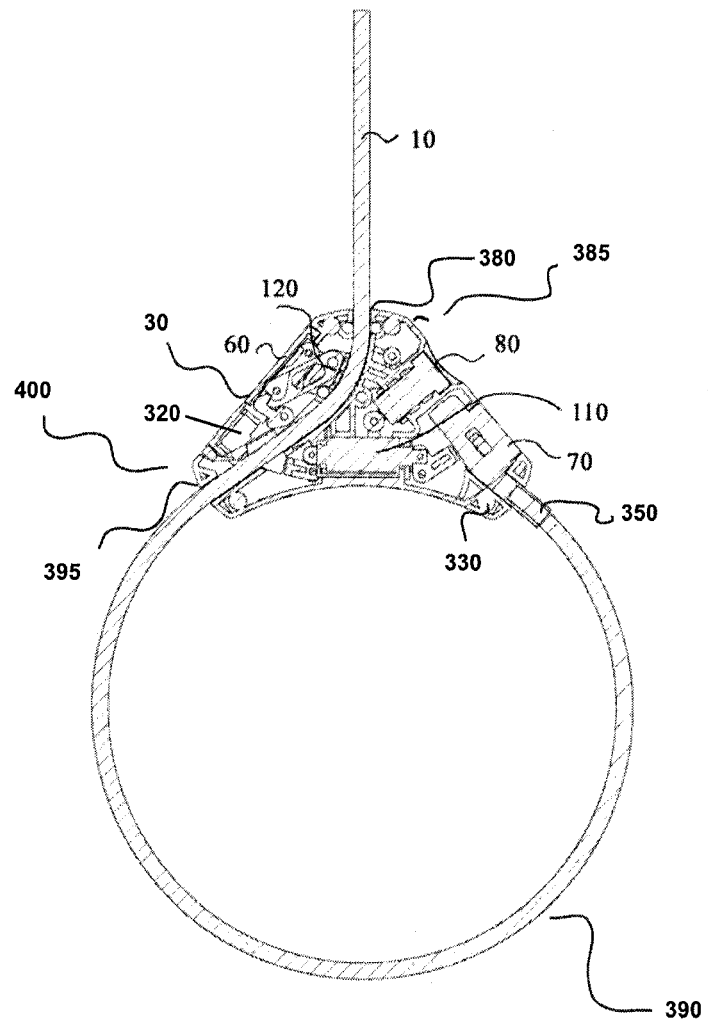
FIG. 12 is an interior view of a collar.

FIGS. 2 to 13 depict embodiments of the present invention wherein a solenoid and batteries are used to power the locks contained in the collar housing and the handle housing. FIG. 7 depicts the interior of the handle housing and FIG. 12 depicts the interior of the collar housing.

Figure 2:
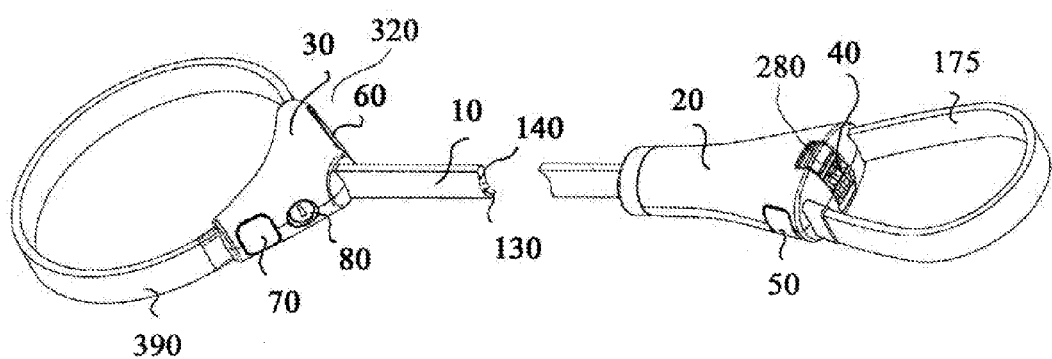
FIG. 2 depicts a top view of a lead having a solenoid lock, showing the leash, collar and handle and also shows the interior middle section of the leash.

In the embodiment of FIG. 2, an example of a lead system of the present invention is shown. The interior of the leash 10 comprises a cut resistant security cable 140 and electrical wires 130 which supply power from batteries 270 (see FIG. 7) located in the handle housing 20 to solenoid 110 located in the collar housing 30 (see FIG. 12). The leash 10 extends through the handle housing 20 forming a handle loop 175, with the handle end of the leash connecting to a fastener 310 of the handle housing 20 (see FIG. 7). The handle housing 20 has a combination lock 40 for locking the fastener 310 on the handle housing 20 and a button 280 which when pressed causes an electric current to be passed through the lead system to a solenoid lock 110 for locking the fastener 330 of the collar housing 30. The leash 10 extends from the handle housing 20 for about 3 to 5 feet to a collar housing 30. The collar end of the leash 10 extends through the collar housing 30 to form a collar loop 390, with the collar end of the leash connecting to a fastener 330 of the collar housing 30. The collar housing of this embodiment includes a key lock 80 which can be used to override the solenoid lock 110 located in the collar housing 30 and a button 70 for releasing the attachment of the collar end of the leash from the fastener 330.

Figure 3:
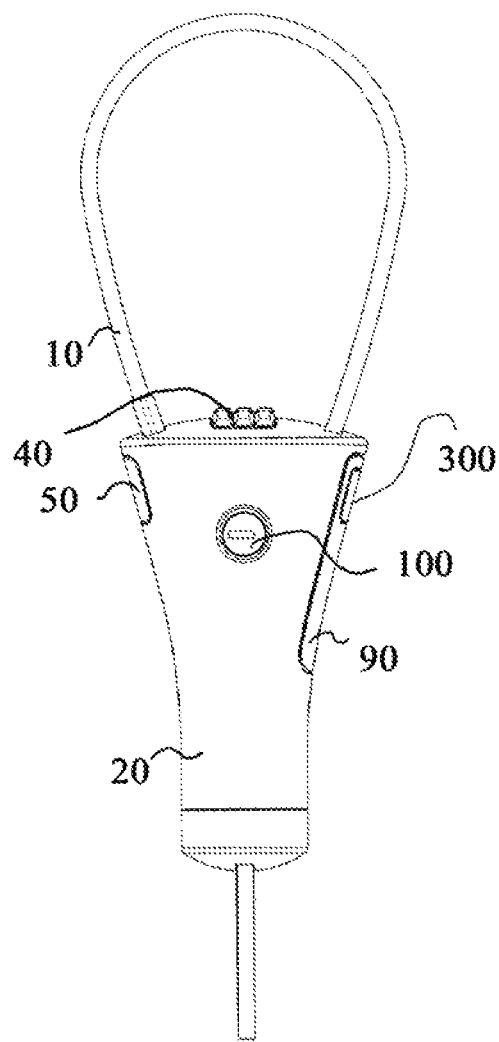
FIG. 3 is a front view of a leash handle.

In the embodiment of FIG. 3, both a combination lock 40 and a key lock 100 are on the handle housing 20. The key lock 100 is a feature designed to enable users to have others walk their pet without giving away the combination or can be used by an owner if the combination is forgotten or lost.

As seen in the embodiment of FIG. 2, the leash 10 has an electric wire 130 which extends along the length of the leash. This wire terminates at an electric contact located at the handle end connector 340 (see FIG. 7) and on the opposing end of the leash at the collar connector 350 at the collar end of the leash (see FIG. 12). Electric contacts are also found at collar faster 330 and the handle fastener 310 located respectively at the top of the collar housing and top of the handle housing to which the connectors attach.

As seen in FIG. 7, the handle end of the leash 10 enters an opening 182 in the bottom end 185 of the handle housing 20. The leash continues through the interior of the housing, past the batteries 270, through a clamp 290 that holds the leash in place. The clamp 290 can be opened using lever 90 located on the side of the handle housing to adjust the circumference of the handle loop 175 forming the handle of the leash and can be closed again using lever 90. Lever 90 is opened by pressing button 300 located on lever 90. When button 300 is pressed, the lever 90 opens, allowing the circumference of the handle to be adjusted to increase or decrease in size as desired (e.g. increased to fit securely around a stationary object such as a pole and decreased to form a suitable handle for walking the animal). When the lever 90 is pushed back into the handle housing 20, the leash 10 is held in place by the clamp 290. The clamp 290 can exert pressure on the leash 10 to hold it in place by, for example, holding the leash in place in between one or two sets of "teeth" that grip onto the leash, similar to the action of the tool known as a locking vice grip.

The leash 10 continues through the handle housing 20 to a second opening 190 located at the top of the handle housing 195, extends out of the housing and forms the handle loop 175, with the connector 340 at the handle end of the leash 10 looping back to the opposing side of the handle housing 20 for attachment to the fastener 310 located on the opposing side of the top of the handle housing. The connector 340 at the handle end of the leash can be released from the fastener 310 e.g. by pressing button 50 located on the side of the handle housing 20.

Similarly, as shown in FIG. 12, the leash 10 enters an opening 380 in the bottom end 385 of the collar housing 30.

The leash 10 continues through the interior of the housing through a clamp 120 that holds the leash 10 in place. The clamp 120 can be opened to adjust the circumference of the collar loop 390 forming the collar of the leash and closed again using lever 60, located in this embodiment on the side of the handle housing 30. The lever 60 is opened by pressing button 320 located on the lever 60. When the button 320 is pressed, the lever 60 opens, which allows the circumference of the collar to be adjusted to increase or decrease the size of the collar so that it comfortably and securely fits the neck of an animal. When the lever 60 is pushed back into the collar housing 30, the leash 10 is held in place by the clamp 120. The clamp 120 can exert pressure on the leash 10 to hold it in place by, for example, holding the leash 10 in place in between one or two sets of "teeth" that grip onto the leash, similar to the action of the tool known as a locking vice grip.

The leash 10 continues through the collar housing 30 to a second opening 395 located at the top of the collar housing 400, extends out of the housing and forms a loop, with the connector 350 at the collar end of the leash 10 looping back to the opposing side of the collar housing for attachment to the fastener 330 located on the opposing side of the top of the collar housing 400. The connector 350 at the end of the collar of the leash can be released from the fastener 330 e.g. by pressing button 70 located on the side of the collar housing 30.

When the combination lock 40, shown in FIG. 7, is set, lock button 280 can be depressed to engage or disengage the locks at the handle and the collar simultaneously. Pressing the lock button 280 sends an electric current from the batteries 270 in the handle housing 20 to electric contacts located at the fastener 310 located on the top of the handle housing 195. The current passes through the electric contacts on the fastener 310 to electric contacts in the connector 340 at the handle end of the leash. The current travels down the wires 130 in the interior of the leash 10 to electric contacts on the connector 350 on the collar end of the leash 10 and then on to electronic contacts on the fastener 330 located on the top of the housing 400. The current then passes from the fastener 310 to a solenoid 110 located within the collar housing 30. The current may be passed directly from the fastener 310 to the solenoid or by means e.g. of a further wire connection. When the current is applied to the solenoid 110, the solenoid 110 ejects a pin that blocks the collar release button 70 and prevents activation of the release button 70. When the lock is not engaged, the collar can be opened by pressing the release button 70 on the collar to disconnect the fastener 330 from the connector 350.

In certain embodiments having the lever 90 on the handle, the lock button 280 also locks the lever 90 on the handle and transmission of a current to the solenoid causes the solenoid to lock the lever 60 on the collar preventing these levers from being opened. When the lock button 280 is pressed again, a second current is transmitted to the solenoid, reversing its action on the pin so that the pin is no longer in a blocking position and allowing the collar and handle levers 60 and 90 to be opened, if desired.

Figure 4:
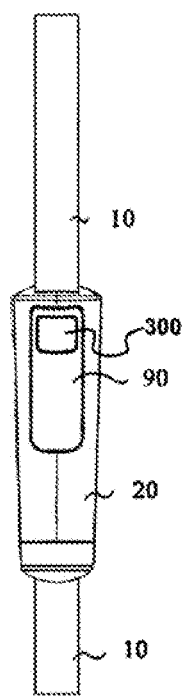
FIG. 4 is a side view of a leash handle.

FIG. 4 shows a side view of a leash at the handle end with the lever 90 and button 300 for opening the lever and FIG. 5 shows a back view of the handle with the lever 90 in the open position for adjusting the circumference of the handle loop. FIG. 6 shows the handle loop opened for attaching around a stationary object.

Figure 8:
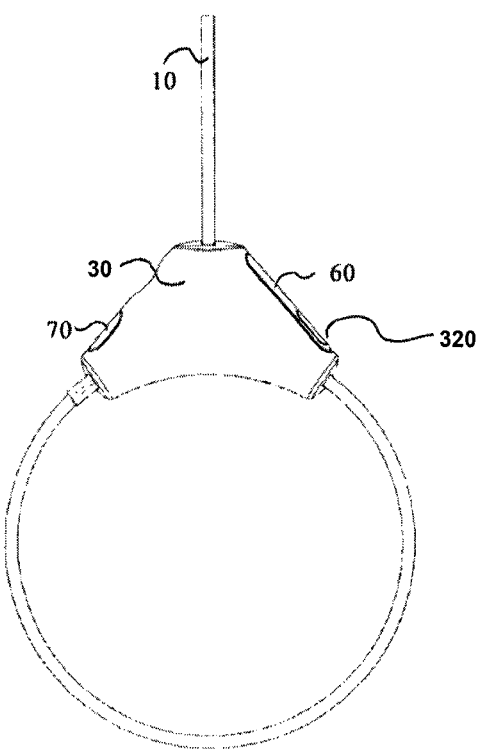
FIG. 8 is a back view of a collar.
Figure 9:
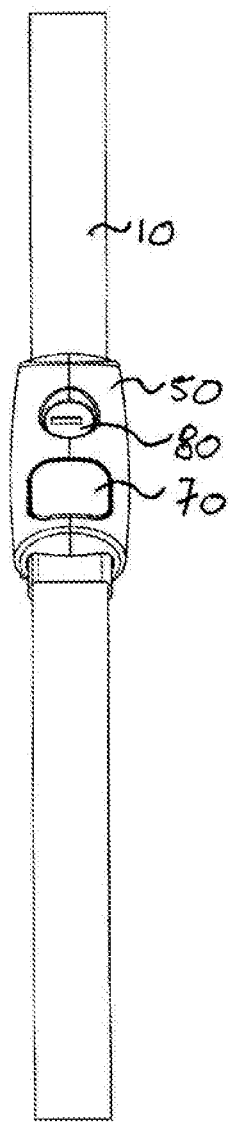
FIG. 9 is a side view of a collar.

FIG. 7 shows a side view of the collar housing 30 having a lock 70 and release button 70. FIG. 8 is a back view of the collar loop and collar housing (shown in interior view in FIG. 12) showing the collar housing 30, the lever 60 and lever button 320 and the collar release button 70. FIG. 10 shows the collar lever 60 in an open position for adjusting the size of the collar and FIG. 11 shows the collar loop in an open position for attaching to an animal.

FIGS. 13 to 19 show another embodiment of the present invention. In this embodiment, the collar lock and handle lock are simultaneously engaged by pushing and/or pulling a cable that runs through the inside of the leash when the lock is opened or closed. The cable is connected to the collar end of the lead. When the lock is closed, the cable pushes or pulls a bead into position to keep both the handle fastener and the collar fastener secured.

In this embodiment, the leash has one or more cables extending through its interior which may give support and structure to the leash and provide the structure for the lock and the fasteners that connect the collar and handle to the leash. Although more than one cable is shown in the present embodiment, it is possible to have only one cable or more than two cables within the leash or that comprise the leash.

Figure 13:
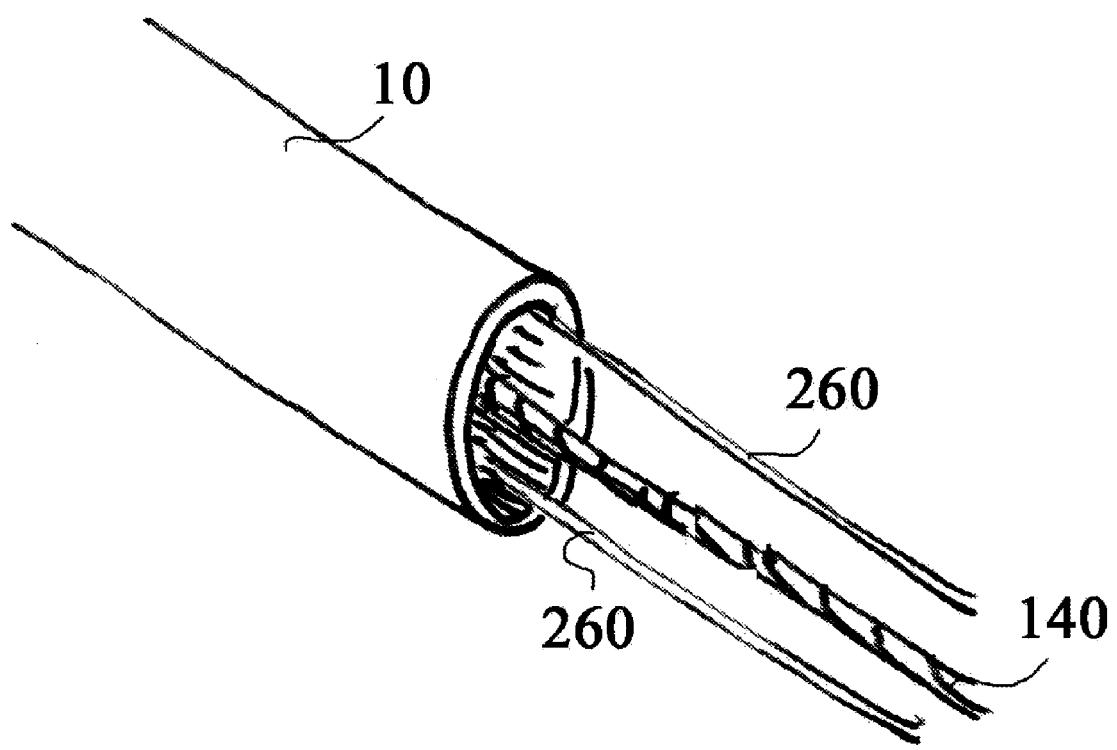
FIG. 13 shows an interior of a lead system having two cables.

FIG. 13 depicts an interior view of a lead system of an embodiment with three cables running through the inside of the leash, with the two outer cables 260 acting as the structure from which other component mount to, and making the leash more difficult to cut, with the third, center cable 140 running through the lead and connecting the lock and the fasteners at the handle and collar.

In this embodiment, the cable can provide the structure upon which the lock and receiving fasteners are mounted. In other embodiments, the lock and fasteners are separate from the cable(s). The cable can be made of steel or similarly strong metal, nylon, plastic or other suitable pliable material having suitable strength, whether man-made or of natural material. In certain embodiments the cable is made of a material is difficult to cut and therefore capable of deterring theft. The cable may be in any suitable shape, e.g. rounded, oval or flat. In some embodiments, the cable is sheathed or runs through a flexible tube like a bicycle's brake cable.

The collar fastener may be designed with a plurality of slots or connecting locations along the collar region of the lead to accommodate variations in the size of the animal's neck. The slots can be made of a rigid material such as metal or appropriate plastic and may be embedded in the leash. In some embodiments, the slots or fastening locations are affixed to the cables in the leash. In another embodiment, the connecting slots are part of cable itself, in yet other embodiments the connecting slots are constructed into the material comprising the lead.

Figure 14:
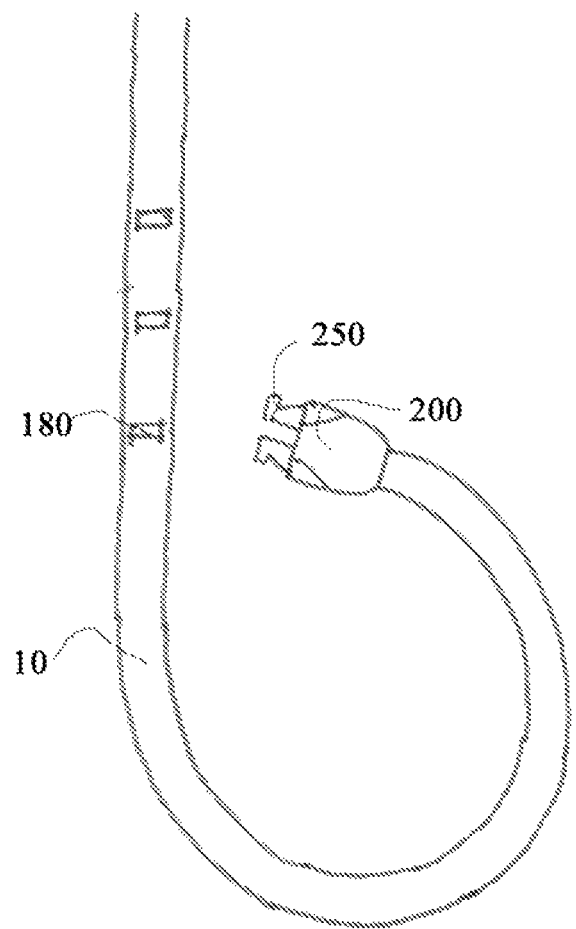
FIG. 14 depicts another embodiment of the present invention wherein the collar is formed by the connector at the collar end of the leash attaching into a fastener in the collar housing.

FIG. 14 shows the region where the collar fastens, showing the fasteners 180 along the leash 10 to which the end of the leash can attach to form a collar. The end of the collar region of the leash 200 and the T shaped head 250 are also shown.

Figure 15:
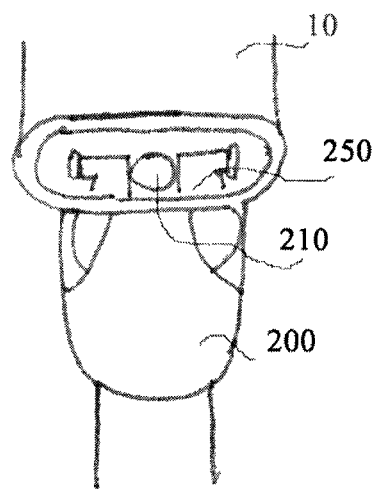
FIG. 15 is a top view of an end of a leash, showing the ball and latches for connecting the end to the connecting region of the leash.

FIG. 15 shows the interior of the end of the collar region 200 of the leash in a locked position with the T shaped head 250 having a bead 210 inserted in between the sections of the head.

Figure 16:
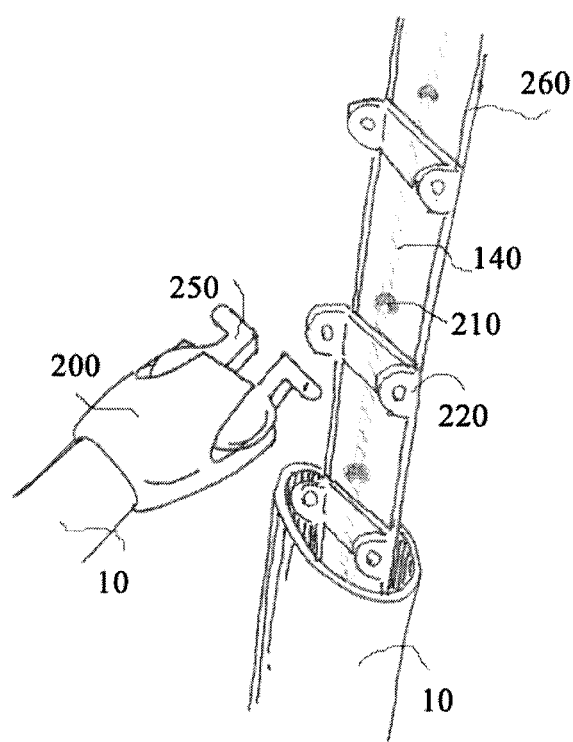
FIG. 16 is an interior view of a lead system having brackets and beads for locking the lead.

In the embodiment shown in FIG. 16, the collar and handle are attached to the leash 10 using a fastener 170 having a 'T' shaped pin that is spring activated to rotate with the squeeze of a button so that the bar on the top of the 'T' rotates vertically to align with the matching shape of the receiving connector and automatically rotates back to the horizontal position when released so that the connector stays attached to the fastener until the button is depressed and the 'T' shaped pin is rotated to match the insertion slot to enable its release. A cable runs through the lead from the lock to the fastener. When the lock is closed or engaged, the cable moves a pin 190 into a position to block the release of the connector. The release button 270 cannot be depressed until the lock is opened and the pin 190 withdrawn by the cable 140. The lock may be opened or closed by means of a key, a combination, fingerprint recognition or one of the many other suitable locks.

In FIG. 16 the inside of the connector is depicted with a T shaped head 250 that fits into the connecting slot of a fastener 220. The cable 140 that runs from the lock to the fastening connector at the collar is also shown. The cable 140 which contains beads 210 moves when the lock is engaged to place the beads into position to secure the lock, thus preventing release of the fastener.

Instead of a single lock located at the collar or handle, another embodiment uses one or more blocks that, in series, blocks each connecting point on the lead. Inside the lead is a cable that connects each block to the lock, which may, for convenience, be located at the handle. When the lock is activated, the block(s) move(s) into a position that interferes with the connection of each of the fasteners so that the connection can not be released when the lock is engaged. The fasteners may act as a clip which has prongs to contain the blocks. This device locks all of the fastening positions regardless of which one is being used. The decision of which fastener position used would depend upon the size of the animal to be secured.

In an embodiment the block(s) can be made of pliable plastic or thin gauge sheet metal with a wavy shape having a pattern of wide and narrow areas such that when the narrow area is in position between the clips of the fastener, the clips may be engaged to open, but when the wide area is between the fastener's clips, the clips cannot be released until the lock is opened because the clips are being blocked. The fastener may be connected to the lock by a cable.

As discussed above, FIG. 16 offers an interior view of an embodiment where the collar connection uses a blocking method to prevent the connection from being released, with a series of connecting brackets 220 secured to the two outer cables 260 and a center cable 140 having beads 210 affixed at the same intervals as there are collar size choices. When the cable is activated by the handle lock, the beads move between the connectors 250 keeping the collar and handle locks from being opened.

In another embodiment, the leash has a series of beads attached to a cable that runs through the restraint to the lock. To accommodate different size pets, the restraint has a number of fasteners to which the connector can attach. These fasteners may act as a clip which has prongs to contain the beads. In order to lock all of these different locking positions, there is a plurality of beads along the cable in the same interval as the distance between the fasteners located at the collar end and the handle end of the leash. When the lock is engaged, the cable and bead rise to fill the space between the prongs of the clip so that the bead cannot be released. The act of opening the lock moves the cable, and therefore the bead, resulting in the releases of the fastener allowing the connection to be opened. The bead may come in a variety of shapes, for example round, square or cone shaped. The bead may be made of any suitable material, or example metal or a suitable man made or natural plastic.

In another embodiment, the handle at the end of the leash is opened so that it can be looped around an immovable object and then reattached to the leash. When the lock, which may be located in the handle, is activated or closed the handle is securely fastened in the closed loop position. Simultaneously, the cable embedded in the leash activates a fastener in the collar so that in one simple motion both the collar and the handle are secured.

In certain embodiments of the present invention, the lock is a key lock. In an embodiment of the present invention, when the lock is turned, the responding side rotates to push or pull the cable locking or unlocking the collar and the handle simultaneously. In another embodiment the locking mechanism is a cylinder lock or key lock. The lock may also be, e.g., a combination lock or fingerprint activated lock or other suitable lock known to one of skill in the art.

Figure 17:
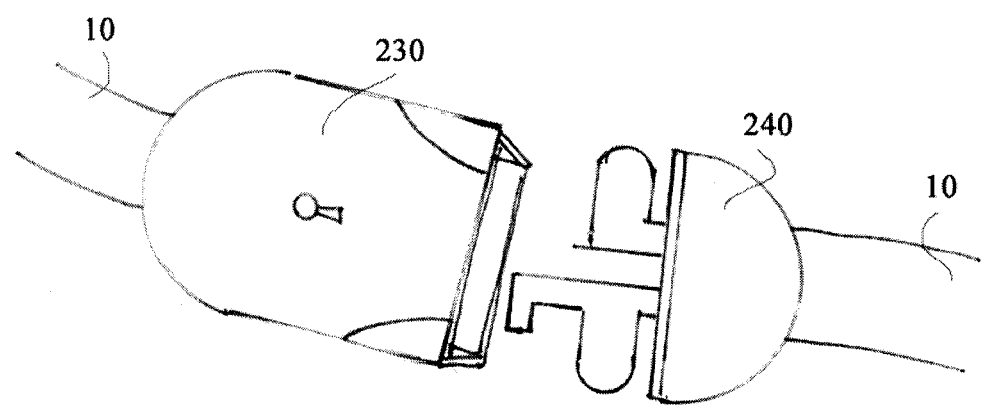
FIG. 17 is a front view of a handle showing a fastener and lock.

FIG. 17 shows a key lock 230 and the handle end of the leash 240.

Figure 18:
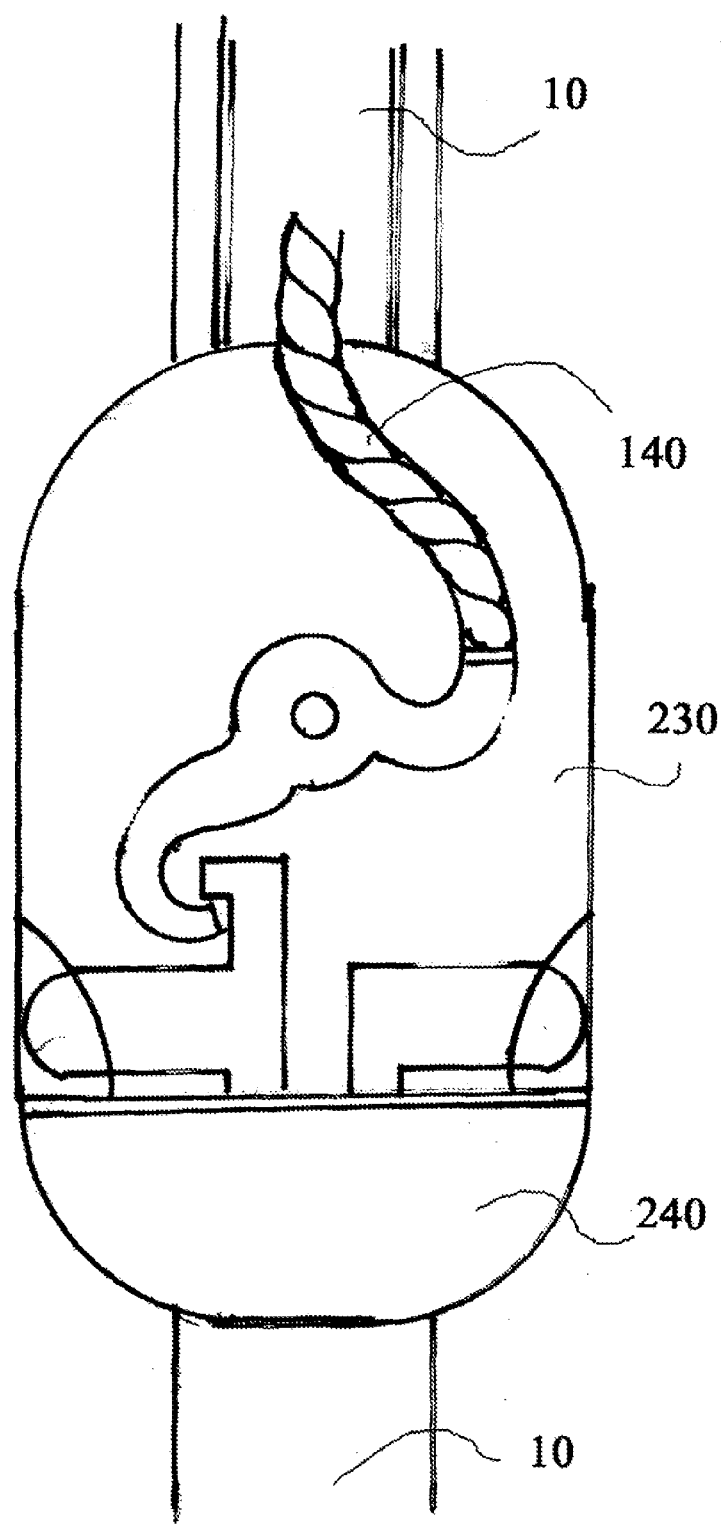
FIG. 18 is an interior view of a lock.
Figure 19:
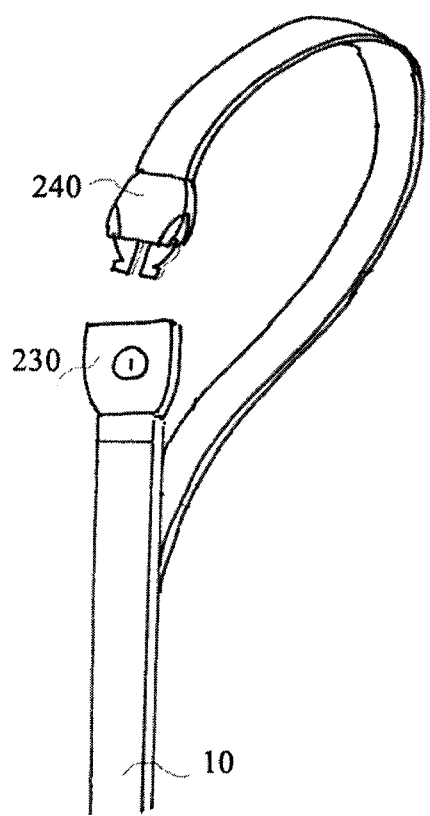
FIG. 19 is a front view of a handle in an open position.

Examples of suitable locks are shown in FIGS. 18 and 19. FIG. 18 shows an interior view of a lock 230 and how activation of the lock 230 pulls the cable 140 within the leash 10 to secure the collar and the handle simultaneously. FIG. 19 is another view showing how the handle end of the leash 240 is inserted into the lock 230.

FIGS. 20-24 show another embodiment of the lead system of the present invention. Each of FIGS. 20 and 22-24 depicts the handle housing having an opening defining a handle 405. As seen in FIGS. 23 and 24, the circumference of the handle loop and the collar loop of the leash are adjustable.

Figure 22:
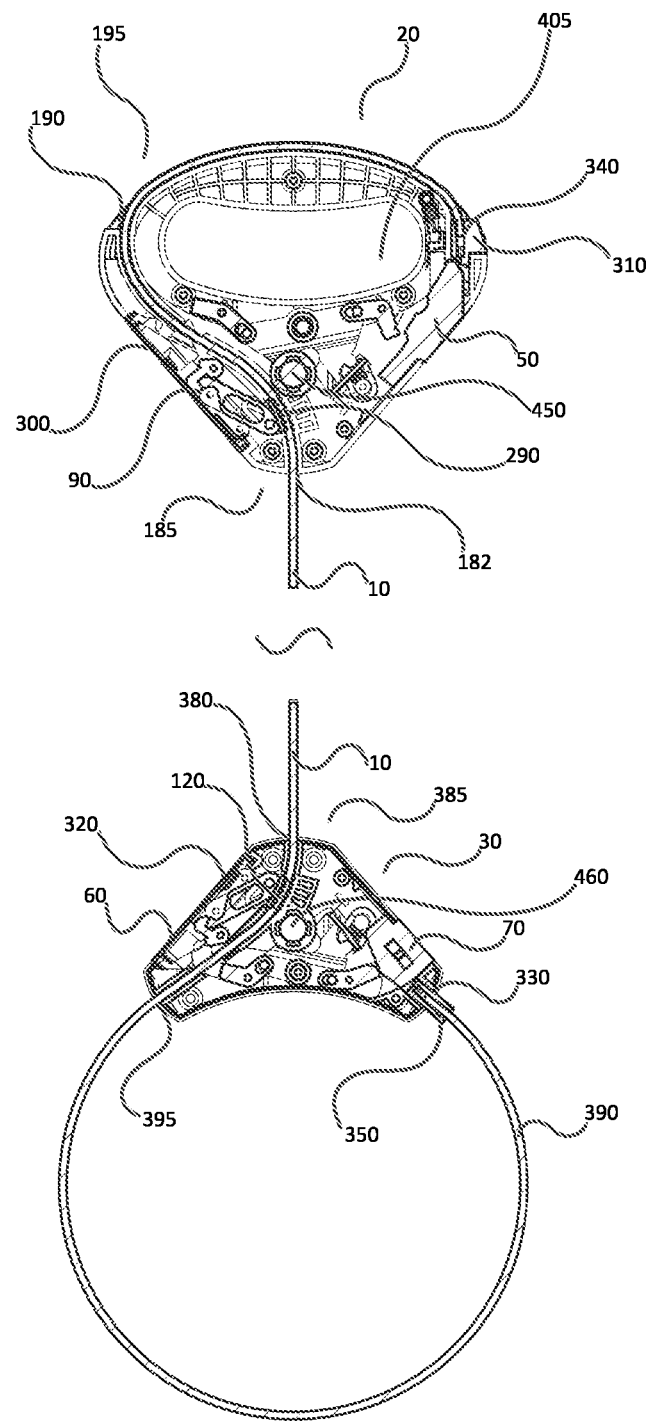
FIG. 22 is an interior view of the collar end and handle end of a lead system, showing a collar and handle that lock separately and for which the circumference of the collar and handle can be adjusted.

As shown in detail in FIG. 22, the handle end of the leash 10 enters an opening 182 in the bottom end 185 of the handle housing 20. The leash continues through the interior of the housing through a clamp 290 that holds the leash in place. The clamp 290 can be opened using lever 90 located on the side of the handle housing to adjust the circumference of the handle loop for attaching the leash e.g. to a stationary object and can be closed again using lever 90. Lever 90 is opened by pressing button 300 located on lever 90. When button 300 is pressed, the lever 90 opens, allowing the circumference of the handle loop to be adjusted to increase or decrease in size as desired (e.g. increased to fit securely around a stationary object such as a pole and decreased to form a suitable handle for walking the animal). When the lever 90 is pushed back into the handle housing 20, the leash 10 is held in place by the clamp 290. The clamp 290 can exert pressure on the leash 10 to hold it in place by, for example, holding the leash in place in between one or two sets of "teeth" that grip onto the leash, similar to the action of the tool known as a locking vice grip.

Figure 20:
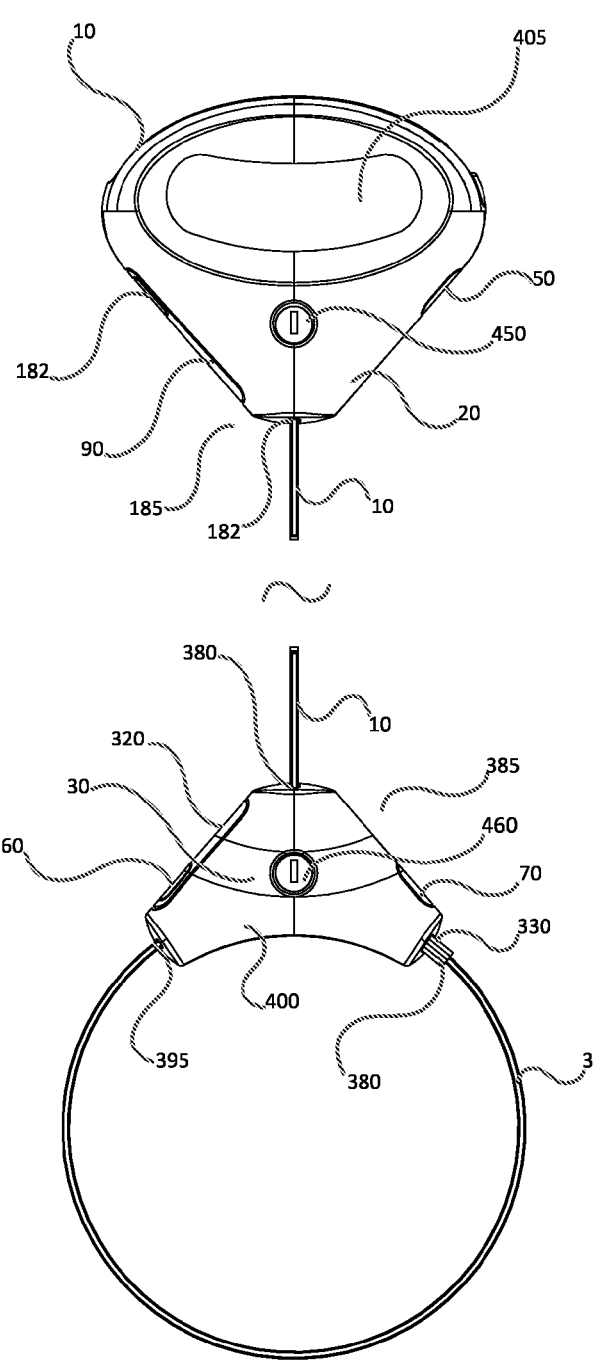
FIG. 20 is a view of a lead, showing a collar end and handle end of a lead system that can lock separately.

The leash 10 continues through the handle housing 30 to a second opening 190 located at the top of the handle housing 195, extends out of the housing and forms a loop, with the connector 340 at the handle end of the leash 10 looping back to the opposing side of the collar housing for attachment to the fastener 310 located on the opposing side of the top of the collar housing 195. The connector 340 at the end of the collar of the leash can be released from the fastener 310 e.g. by pressing button 50 located on the side of the handle housing 20. As also depicted in FIGS. 20 and 22, the handle housing 20 has a lock 450 for locking the fastener 310 on the handle housing 20. When the lock is engaged, the button 50 is blocked, such that it cannot be activated and the collar end of the leash cannot be released. The lever 90 also can be locked by the lock 450.

The leash 10 extends from the handle housing 20 for about 3 to 5 feet to a collar housing 30. The collar end of the leash 10 extends through the collar housing 30 to form a collar loop 390, with the collar end of the leash connecting to a fastener 330 of the collar housing 30. The collar housing has a lock 460 for locking the fastener 330 of the collar housing 30.

As also seen in FIGS. 20 and 22, the leash 10 enters an opening 380 in the bottom end 385 of the collar housing 30. The leash 10 continues through the interior of the housing through a clamp 120 that holds the leash 10 in place. The clamp 120 can be opened to adjust the circumference of the collar loop 390 forming the collar of the leash and closed again using lever 60, located in this embodiment on the side of the handle housing 30. The lever 60 is opened by pressing button 320 located on the lever 60. When the button 320 is pressed, the lever 60 opens, which allows the circumference of the collar to be adjusted to increase or decrease the size of the collar so that it comfortably and securely fits the neck of an animal. When the lever 60 is pushed back into the collar housing 30, the leash 10 is held in place by the clamp 120. The clamp 120 can exert pressure on the leash 10 to hold it in place by, for example, holding the leash 10 in place in between one or two sets of "teeth" that grip onto the leash, similar to the action of the tool known as a locking vice grip.

The leash 10 continues through the collar housing 30 to a second opening 395 located at the top of the collar housing 400, extends out of the housing and forms a loop, with the connector 350 at the collar end of the leash 10 looping back to the opposing side of the collar housing for attachment to the fastener 330 located on the opposing side of the top of the collar housing 400. The connector 350 at the end of the collar of the leash can be released from the fastener 330 e.g. by pressing button 70 located on the side of the collar housing 30. As also depicted in FIGS. 20 and 22, the collar housing 20 has a lock 460 for locking the fastener 310 on the handle housing 20. When the lock is engaged, the button 70 is blocked, such that it cannot be activated and the collar end of the leash cannot be released. The lever 60 also can be locked by the lock 460.

Figure 21:
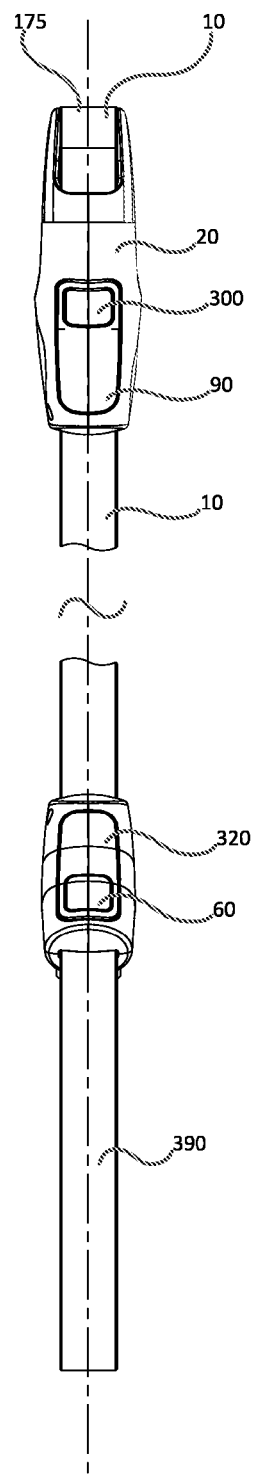
FIG. 21 is a side view of the collar end and handle end of a lead system, showing the exterior of the mechanism for adjusting the size of the collar and handle.

FIG. 21 shows a side view of the lead system of this embodiment showing the lever 90 of the handle housing and the lever 60 of the collar housing, along with the respective buttons 300 and 320 for opening the levers.

FIGS. 23 and 24 depict the collar and housing regions of the lead system when the fasteners are not engaged and the levers are open, allowing for expansion or contraction of the circumference of the handle and collar loop. The handle housing in these Figures includes an opening defining a handle 405. As seen in FIG. 24, the handle housing may include a recessed area 510 for containing the handle end of the leash. When the fastener 340 is released from the connector 310 and the lever 90 is opened, the handle loop 175 can be expanded to a desired circumference for attachment to an object. The handle loop 175 can be set at the desired circumference by engaging the lock 450.

In certain embodiments, the lock may be located at the end of the leash closest to the handle or may be part of the leash forming the handle. The handle loop is formed by connecting the lead back to itself. In other embodiments the lock is located anywhere else along the lead and may be integral to the lead.

In certain embodiments, the outer portion of the lead is preferably comprised of a pliable and tough material which may be either man made or of a natural material. In certain embodiments the material forming the outer portion of the leash can withstand the forces exerted on an animal lead system, e.g. the pulling of an animal. In further embodiments, the outer portion of the leash is made of a material resistant to being cut to prevent or deter theft. Suitable materials may include rubber, plastic, silicone rubber, leather, nylon or cotton. In an embodiment of the invention, the outer portion is made of a synthetic plastic, rubber or silicone rubber which offer the manufacturing advantage of being made using a molding process.

The lead may also be made of a soft and pliable synthetic rubber or plastic, e.g. silicone, that is also tough and resistant to damage. In other embodiments, the leash is made of textiles, natural and manmade, leather, cotton, etc.

The lead system of the present invention can be used to secure a domesticated animal when transported to a location where theft is an issue. Domesticated animals that can be secured with the lead include dogs, cats, iguanas, lizards, rabbits or monkeys.

As noted above, in certain embodiments, the collar and handle are adjustable and may be locked into a size using the lever and locking systems described above. In other embodiments, the lead system can have a plurality of fastening positions at the collar for different size animals.

In certain embodiments, the lead system is manufactured in different sizes to accommodate different sizes and weights of domesticated animals. The sizes may be designated by general sizes (e.g. small, medium, or large) or specific sizes by breed (e.g. toy poodle, labrador).

It is understood that that the foregoing description merely illustrates the invention and that modification such as width, length and stylistic revisions may be made within the scope of the appended claims. For example, to suit specific breeds, securing leashes with different ratios of width to length may be manufactured or a variety of gauge cables, locks and features.

I claim:

1. A lead system for a domesticated animal that locks at a collar end and at a handle end to prevent theft, comprising:
   1) a single continuous leash extending from a first end terminating in a first tip to a second end terminating in a second tip, wherein a handle is formed by extending the first end of the leash through a handle housing to form a loop and then releasably connecting the first tip of the leash into a handle fastener in the handle housing and a collar is formed by extending the second end of the leash through a collar housing to form a loop and then releasably connecting the second tip of the leash into a collar fastener in the collar housing, said handle housing including a handle fastener button for releasing the connection of the first tip of the leash from the handle fastener and said collar housing including a collar fastener button for releasing the connection of the second tip of the leash from the collar fastener; and
   2) a handle lock located in the handle housing capable of securing the first tip in the handle fastener and a collar lock located in the collar housing capable of securing the second tip in the collar fastener to enable the animal to be secured to an immovable object wherein the handle housing includes a housing lever for adjusting the circumference of the handle when a first button on the housing lever is pushed and the collar housing includes a collar lever for adjusting the circumference of the collar when a second button on the collar lever is pushed, and wherein said handle lock also secures the handle lever and the collar lock also secures the collar lever, wherein the handle housing includes a recess across at least a portion of the top of the handle housing for containing a handle portion of the leash.

2. The lead system of claim 1, wherein the leash is held in place in the handle housing by a handle clamp and wherein activation of the housing lever releases the handle clamp, allowing the circumference of the handle to be adjusted and the leash is held in place in the collar housing by a collar clamp and wherein activation of the collar lever releases the collar clamp, allowing the circumference of the collar to be adjusted.

3. The lead system of claim 1, wherein the leash is retractable to increase or decrease the length of the leash.

4. The lead system of claim 1, wherein the handle and collar locks are mechanical locks.

5. The lead system of claim 1, having both a mechanical lock and an electronic lock.

6. The lead system of claim 1, having more than 2 mechanical locks.

7. The lead system of claim 6, wherein the collar housing contains a combination lock and a key lock and the handle housing contains a combination lock and a key lock.

8. The lead system of claim 1, wherein the collar lock is automatically locked when the handle lock is activated.

9. The lead system of claim 8, wherein activation of the handle lock results in activation of a linear activated solenoid lock located in the collar housing.

10. The lead system of claim 9, wherein the power for the solenoid lock is provided by one or more batteries.

11. The lead system of claim 1, wherein the handle and collar locks are electronic.

12. The lead system of claim 1, wherein the handle housing has an opening defining a handle.

13. The lead system of claim 1, wherein, after the first tip is releasably connected to the handle fastener, activation of a mechanical lock located in the handle housing locks the handle fastener and the handle lever and sends a current powered by a battery located in the handle housing through a wire located in the interior of the leash to collar electrical contact located in the second tip and then to the collar fastener and then to a solenoid lock located within the collar housing which locks the collar fastener and the collar lever.

14. A lead system for a domesticated animal that locks at a collar end and at a handle end to prevent theft, comprising:
1) a single continuous leash extending from a first end terminating in a first tip to a second end terminating in a second tip;
2) a handle formed by extending the first end of the leash through an opening in a bottom end of a handle housing, through the interior of the handle housing and then out through an opening in a top end of the handle housing to form a handle loop, with the first tip of the leash releasably connecting into a handle fastener in the handle housing, said handle housing including a handle fastener button for releasing the connection of the first tip of the leash from the handle fastener, said handle housing further including a handle lever for adjusting the circumference of the handle loop when a button on the handle lever is pushed, wherein when the handle lever is flush with the surface of the handle housing, the leash is prevented from moving within the handle housing and when the handle lever is activated by pushing a handle lever button on the handle lever, the handle lever extends and opens outwardly from the surface of the handle housing, enabling the circumference of the handle to be expanded or reduced;
3) a collar formed by extending the first end of the leash through an opening in a bottom end of a collar housing, through the interior of the collar housing and then out through an opening in a top end of the collar housing to form a collar loop, with the first tip of the leash releasably connecting into a collar fastener in the collar housing, said collar housing including a collar fastener button for releasing the connection of the first tip of the leash from the collar fastener, said collar housing further including a collar lever for adjusting the circumference of the collar loop when a button on the collar lever is pushed, wherein when the collar lever is flush with the surface of the collar housing, the leash is prevented from moving within the collar housing and when the collar lever is activated by pushing a collar lever button on the collar lever, the collar lever extends and opens outwardly from the surface of the collar housing, enabling the circumference of the collar to be expanded or reduced; and
4) a handle lock located in the handle housing capable of securing the first tip in the handle fastener and capable of securing the handle lever in the position flush with the surface of the handle housing to prevent movement of the leash within the handle housing and a collar lock located in the collar housing capable of securing the second tip in the collar fastener to enable the animal to be secured to an immovable object and also capable of securing the collar lever in the position flush with the surface of the handle housing to prevent movement of the collar within the collar housing.

15. The lead system of claim 14, wherein the handle housing has an opening defining a handle.

16. The lead system of claim 14, wherein the handle housing includes a recess across at least a portion of the top of the handle housing for containing a handle portion of the leash.

17. The lead system of claim 14, wherein the leash is held in place in the handle housing by a handle clamp and wherein activation of the housing lever releases the handle clamp, allowing the circumference of the handle to be adjusted and the leash is held in place in the collar housing by a collar clamp and wherein activation of the collar lever releases the collar clamp, allowing the circumference of the collar to be adjusted.

18. The lead system of claim 14, wherein, after the first tip is releasably connected to the handle fastener, activation of a mechanical lock located in the handle housing locks the handle fastener and the handle lever and sends a current powered by a battery located in the handle housing through a wire located in the interior of the leash to a collar electrical contact located in the second tip and then to the collar fastener and then to a solenoid lock located within the collar housing which locks the collar fastener and collar lever.

* * * * *